United States Patent
Sekiguchi

(10) Patent No.: US 9,224,428 B2
(45) Date of Patent: Dec. 29, 2015

(54) RECORDING APPARATUS AND CONTROL METHOD THEREOF

(71) Applicant: CANON KABUSHIKI KAISHA, Tokyo (JP)

(72) Inventor: Tomohiro Sekiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 14/107,738

(22) Filed: Dec. 16, 2013

(65) Prior Publication Data

US 2014/0178039 A1   Jun. 26, 2014

(30) Foreign Application Priority Data

Dec. 26, 2012   (JP) ................................ 2012-283672

(51) Int. Cl.
*H04N 5/77* (2006.01)
*G11B 27/32* (2006.01)

(52) U.S. Cl.
CPC .......... *G11B 27/322* (2013.01); *G11B 2220/41* (2013.01)

(58) Field of Classification Search
USPC ................................. 386/224–227
See application file for complete search history.

(56) References Cited

U.S. PATENT DOCUMENTS

| | | | |
|---|---|---|---|
| 7,868,931 B2 * | 1/2011 | Fujita | 348/231.2 |
| 2005/0069296 A1 * | 3/2005 | Yoshida et al. | 386/111 |
| 2005/0271365 A1 * | 12/2005 | Hisatomi | 386/94 |
| 2009/0080562 A1 * | 3/2009 | Franson | 375/268 |
| 2009/0162030 A1 * | 6/2009 | Kogusuri | 386/117 |

FOREIGN PATENT DOCUMENTS

JP    2007-288557 A    11/2007

* cited by examiner

*Primary Examiner* — Nigar Chowdhury
(74) *Attorney, Agent, or Firm* — Cowan, Liebowitz & Latman, P.C.

(57) ABSTRACT

A recording apparatus independently sets conditions of information data to be simultaneously recorded in a plurality of recording media in a simultaneous recording mode according to a user instruction. The recording apparatus processes information data according to the set conditions so as to generate a plurality of information data to be recorded in the plurality of recording media in the simultaneous recording mode, and their identification information, and records the plurality of generated information data and identification information in the plurality of recording media. When different conditions are set as the conditions of the information data to be simultaneously recorded in the plurality of recording media, a plurality of pieces of identification information which have different values are generated for the information data to be simultaneously recorded in the plurality of recording media.

12 Claims, 6 Drawing Sheets

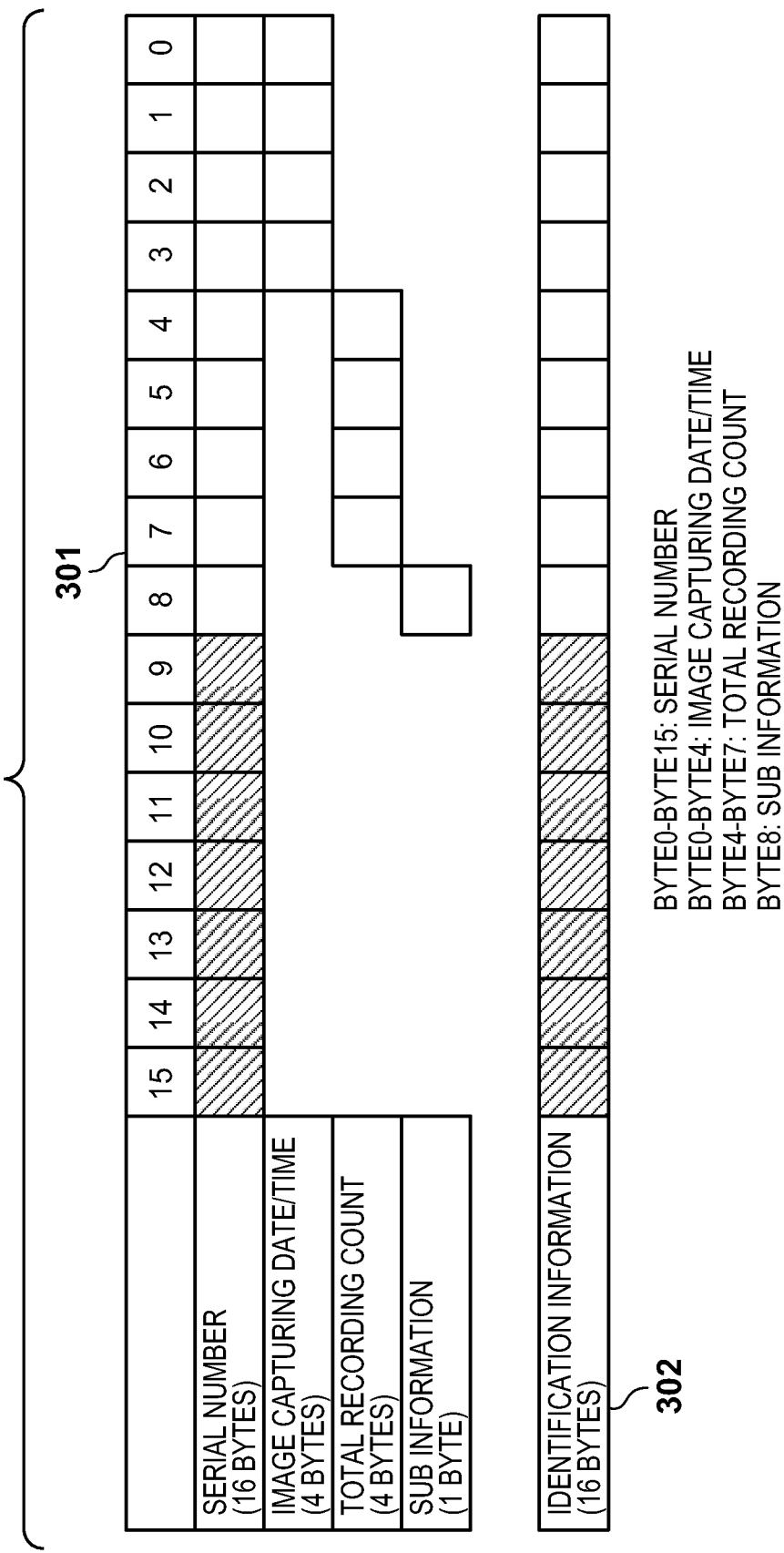

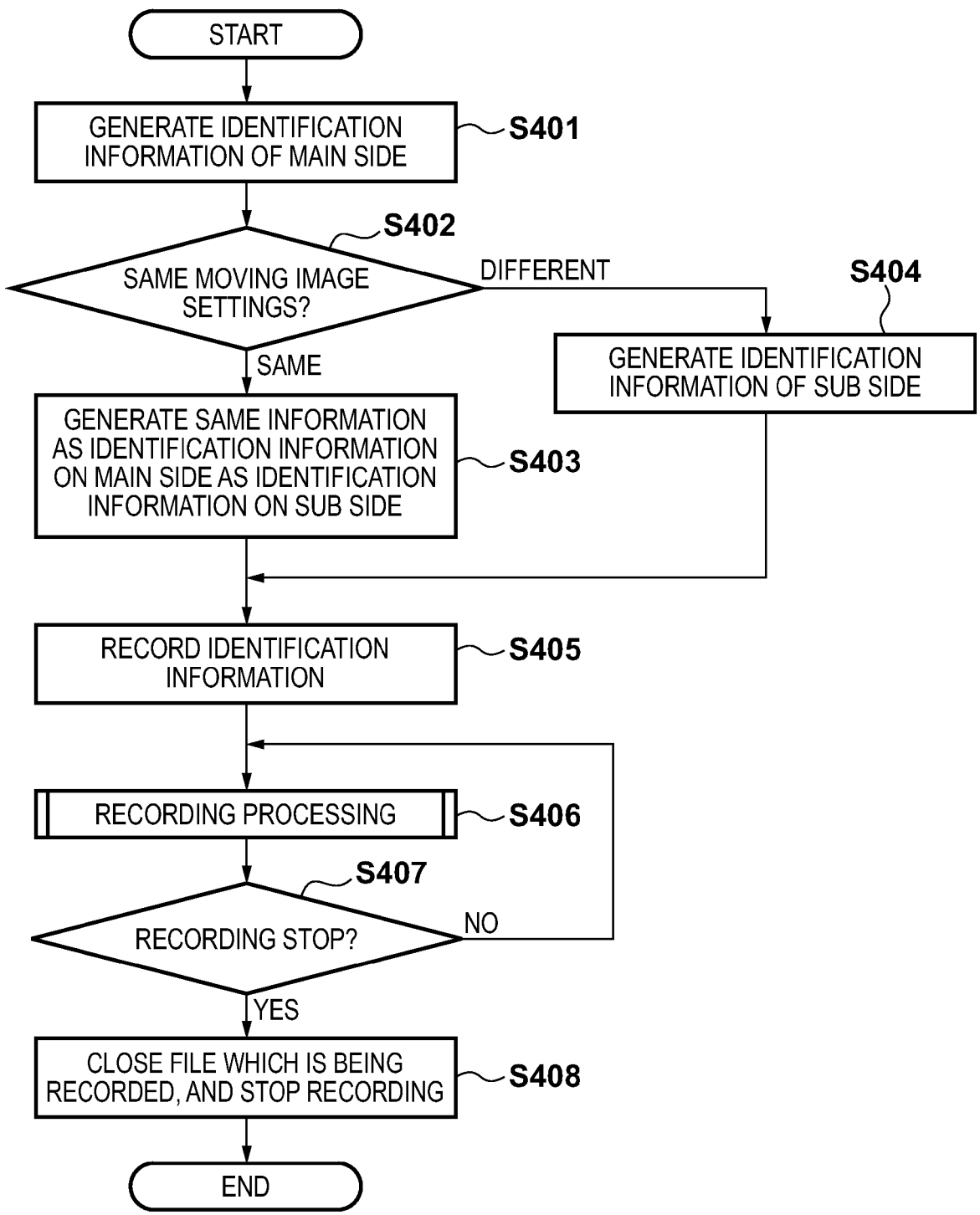

RECORDING APPARATUS AND CONTROL METHOD THEREOF

BACKGROUND OF THE INVENTION

1. Field of the Invention

The present invention relates to a recording apparatus which can simultaneously record a plurality of moving images, and a control method thereof.

2. Description of the Related Art

In general, a recording apparatus which records a moving image signal and audio signal on a recording medium is known. In recent years, a home video camera, which records moving image and audio data on a randomly accessible large-capacity recording medium such as randomly accesses a memory card, HDD, and the like, has appeared and prevailed at home. For example, Japanese Patent Laid-Open No. 2007-288557 (to be referred to as literature 1 hereinafter) describes, as a home DVD recorder, a hard disk recorder which incorporates a large-capacity hard disk (HDD) and includes a DVD drive. The hard disk recorder described in literature 1 has a function of copying a moving image signal and audio signal of a TV program or the like, which is temporarily recorded in the HDD, to a DVD loaded in the DVD drive.

On the other hand, at a broadcast site or the like, very high reliability is required for a recorded moving image signal compared to an image capturing operation at home. Thus, some video cameras for professional use have a function of simultaneously recording a single moving image on a plurality of recording media. By recording an identical moving image on the plurality of recording media, even when a moving image recorded on some recording media cannot be correctly reproduced, or even when some recording media are lost, the identical moving image can be reproduced from other recording media.

In this manner, when an identical moving image is simultaneously recorded on the plurality of recording media, the user has to reproduce respective moving images to search for the moving image simultaneously recorded on the recording media, resulting in troublesome operations. When a moving image is simultaneously recorded on two recording media, a data rate and the number of pixels of the moving image on one medium may be set to be lower than those of the moving image on the other medium so that the moving image is to be uploaded onto a Web or is used in an edit operation or the like.

SUMMARY OF THE INVENTION

One embodiment of the present invention discloses, in consideration of such related art technique, a recording apparatus which allows the user to easily identify whether or not information data are recorded according to the same settings when the information data such as a moving image signal and audio signal are simultaneously recorded on a plurality of recording media, and a control method thereof.

According to one aspect of the present invention, there is provided a recording apparatus comprising: a setting unit configured to independently set conditions of a plurality of information data to be simultaneously recorded in a plurality of recording media in a simultaneous recording mode according to a user instruction; a processing unit configured to process information data according to the conditions set by the setting unit so as to generate a plurality of information data to be recorded in the plurality of recording media in the simultaneous recording mode; a generation unit configured to generate a plurality of pieces of identification information respectively for the plurality of information data to be recorded in the plurality of recording media in the simultaneous recording mode; and a recording unit configured to record the plurality of information data generated by the processing unit and the plurality of pieces of identification information generated by the generation unit in the plurality of recording media in the simultaneous recording mode, wherein when different conditions are set as the conditions of the information data to be simultaneously recorded in the plurality of recording media, the generation unit generates a plurality of pieces of identification information which have different values for the information data to be simultaneously recorded in the plurality of recording media.

Also, according to another aspect of the present invention, there is provided a recording apparatus comprising: an image capturing unit; a setting unit configured to independently set conditions of a plurality of moving image data to be simultaneously recorded in a plurality of recording media in a simultaneous recording mode according to a user instruction, the conditions including a plurality of items; a processing unit configured to process the moving image data acquired by the image capturing unit according to the conditions set by the setting unit so as to generate a plurality of moving image data to be recorded in the plurality of recording media in the simultaneous recording mode; a generation unit configured to generate a plurality of pieces of identification information respectively for the plurality of moving image data to be recorded in the plurality of recording media in the simultaneous recording mode; and a recording unit configured to record the plurality of moving image data generated by the processing unit and the plurality of pieces of identification information generated by the generation unit in the plurality of recording media in the simultaneous recording mode, wherein when different conditions are set in at least some of the plurality of items related to the moving image data to be simultaneously recorded in the plurality of recording media, the generation unit generates a plurality of pieces of identification information which assume different values for the moving image data to be simultaneously recorded in the plurality of recording media.

Furthermore, according to another aspect of the present invention, there is provided a control method of a recording apparatus, comprising: a setting step of independently setting conditions of a plurality of information data to be simultaneously recorded in a plurality of recording media in a simultaneous recording mode according to a user instruction; a processing step of processing information data according to the conditions set in the setting step so as to generate a plurality of information data to be recorded in the plurality of recording media in the simultaneous recording mode; a generation step of generating a plurality of pieces of identification information respectively for the plurality of information data to be recorded in the plurality of recording media in the simultaneous recording mode; and a recording step of recording the plurality of information data generated in the processing step and the plurality of pieces of identification information generated in the generation step in the plurality of recording media in the simultaneous recording mode, wherein in the generation step, when different conditions are set as the conditions of the information data to be simultaneously recorded in the plurality of recording media, a plurality of pieces of identification information which have different values are generated for the information data to be simultaneously recorded in the plurality of recording media.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing additional information and identification information;

FIG. 4 is a flowchart showing processing of the simultaneous recording mode.

DESCRIPTION OF THE EMBODIMENTS

Figure 1:
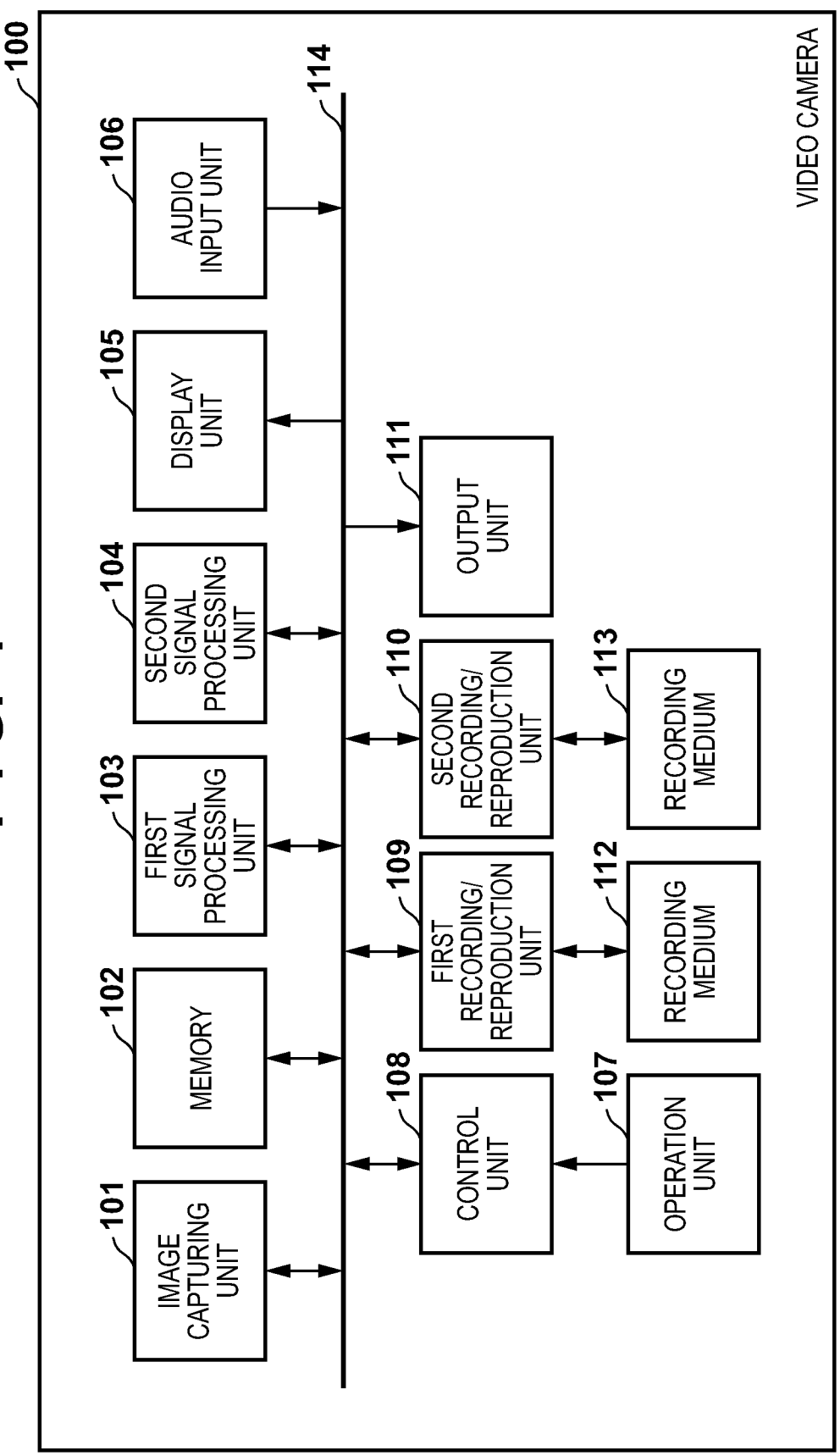
FIG. 1 is a block diagram showing the arrangement of a recording apparatus according to an embodiment of the present invention.

FIG. 1 is a block diagram showing an arrangement example of a video camera 100 as a recording apparatus according to the first embodiment. Note that the video camera 100 allows the user to select two recording formats, that is, an AVCHD format (first recording method) and an MP4 format (second recording method), and records a moving image signal or audio signal input via an image capturing unit 101 according to these formats. Note that the video camera 100 may have an arrangement for recording a moving image signal and audio signal according to recording methods other than these recording formats.

Referring to FIG. 1, the image capturing unit 101 captures an image of an object, and generates and outputs a moving image signal. The image capturing unit 101 includes an optical system such as a zoom lens and focus lens, an image sensor such as a CMOS, an iris, an A/D converter for converting a captured moving image signal into a digital signal, a processing circuit for applying required processing to a captured moving image, and the like. When a still image capturing instruction is output from a control unit 108, the image capturing unit 101 generates a still image signal for one frame at a timing corresponding to the still image capturing instruction, and stores the still image signal in a memory 102. Also, the image capturing unit 101 can output a moving image having a size of 1920 pixels in the horizontal direction×1080 pixels in the vertical direction as a maximum size, and including 30 frames per sec. The image capturing unit 101 outputs a moving image signal of a format according to the number of pixels and a frame rate, which are set by the user, as will be described later.

The memory 102 stores a moving image signal and still image signal output from the image capturing unit 101, and other data. Each of a first signal processing unit 103 and second signal processing unit 104 applies encoding processing according to a known encoding method such as MPEG to a moving image signal captured by the image capturing unit 101, so as to compress an information volume of that signal. Also, each of the first and second signal processing units 103 and 104 applies known encoding processing such as AAC to an audio signal input from an audio input unit 106.

Note that the first and second signal processing units 103 and 104 can operate at the same time. For example, the first signal processing unit 103 can execute processing according to the AVCHD format, while the second signal processing unit 104 can execute processing according to the MP4 format. Alternatively, the first and second signal processing units 103 and 104 respectively execute processing according to the MP4 format, and can output moving image data having different data rates. Also, the first and second signal processing units 103 and 104 can be configured as independent hardware (ASIC) components, or can be configured as a single hardware component. Furthermore, the first and second signal processing units 103 and 104 can be implemented by software processing. The first and second signal processing units 103 and 104 independently operate according to individual control signals (instructions) from the control unit 108.

Each of the first and second signal processing units 103 and 104 stores a processed moving image in the memory 102. Also, upon reception of a still image capturing instruction from the control unit 108, each of the first and second signal processing units 103 and 104 applies known encoding processing such as JPEG to a still image signal stored in the memory 102, and stores the processed still image signal in the memory 102. Furthermore, each of the first and second signal processing units 103 and 104 stores thumbnail images of a still image and moving image in the memory 102. These moving images, still images, and thumbnails are recorded in a recording medium 112 and recording medium 113 by a first recording/reproduction unit 109 and second recording/reproduction unit 110. Each of the first and second signal processing units 103 and 104 reproduces recorded moving files and still image files on a display unit 105 in a reproduction mode. Furthermore, each of the first and second signal processing units 103 and 104 can index-display thumbnail images of moving image files and still image files on the display unit 105, and allows the user to select an image file to be reproduced.

Upon reception of a thumbnail generation instruction from the control unit 108, each of the first and second signal processing units 103 and 104 generates thumbnail images of recorded moving image files and still image files. For example, in case of a moving image file of the AVCHD format, a thumbnail image is generated by decoding a moving image signal and reducing frame image data near the first frame. Also, in case of an MP4 file, a thumbnail image is generated by decoding thumbnail image data stored in a moving image file.

Each of the first and second signal processing units 103 and 104 displays an index screen including thumbnail images on the display unit 105. When the user selects a file to be reproduced on the index screen including thumbnail images, a corresponding moving image file or still image file is reproduced. The display unit 105 displays a moving image, still image, and various kinds of information according to an instruction from the control unit 108. The display unit 105 includes a known display device such as a liquid crystal panel.

The control unit 108 includes a microcomputer (CPU), a required memory, and the like, and controls operations of the respective units of the video camera 100 according to an instruction from an operation unit 107 according to a program stored in the memory 102. The operation unit 107 includes various switches such as a power switch, a trigger switch used to instruct to start/stop a moving image capturing operation, a still image capturing switch, a zoom switch, a reproduction switch, and a menu switch. The control unit 108 accepts a user instruction from the operation unit 107. Note that some switches of the operation unit 107 may be included in a touch panel, which may be mounted on the display unit 105.

The first recording/reproduction unit 109 records various data such as moving image data and still image data in the recording medium 112, and reads out recorded moving image data, still image data, and the like according to an instruction from the control unit 108. The recording medium 112 is incorporated in the main body of the video camera 100, and is, for example, a randomly accessible recording medium such as a large-capacity flash memory or hard disk (HDD). The second recording/reproduction unit 110 records various data such as moving image data and still image data in the recording medium 113, and reads out recorded moving image data, still image data, and the like according to an instruction from the control unit 108.

The first and second recording/reproduction units 109 and 110 manage various data such as moving image signals and still image signals recorded in the recording media 112 and 113 as files according to a known file system such as FAT. The recording medium 113 is a randomly accessible recording medium such as a memory card or hard disk (HDD).

In this embodiment, the recording medium 113 is a memory card incorporating a flash memory, and is a detachable recording medium. Also, the user can easily load/eject the recording medium 113 into/from the video camera 100 by a loading/ejection mechanism (not shown). The second recording/reproduction unit 110 includes a lid (not shown) required to protect the recording medium 113 to be loaded. The user loads/ejects the recording medium 113 by opening the lid. When the user closes the lid while the recording medium 113 is loaded, a moving image recording operation can be executed, as will be described later. When the user opens the lid during recording or the like, a moving image recording operation is stopped. Note that in this embodiment, the recording medium 112 is that incorporated in the video camera 100, and the recording medium 113 is that which is detachable from the video camera 100. Alternatively, the recording medium 112 may be that which can be loaded/ejected, in the same manner as the recording medium 113. That is, the recording media 112 and 113 can be those which are independent of each other.

An output unit 111 outputs a moving image signal obtained by the image capturing unit 101, a reproduced moving image signal and audio signal, and the like to an external device of the video camera 100. An internal bus 114 is used to transfer various data and commands between the respective units of the video camera 100.

The basic image capturing processing and reproduction processing of the video camera 100 will be described below. When the user turns on a power switch of the video camera 100 using the operation unit 107, the control unit 108 controls the respective units to display a moving image of an object according to a moving image signal obtained by the image capturing unit 101 on the display unit 105, and then sets a recording standby state. The video camera 100 can record and reproduce a moving image signal in and from the internal recording medium 112 and detachable recording medium 113. In the image capturing processing, the user selects one of these two recording media as that of a recording destination by operating the operation unit 107 when the video camera 100 is in a recording standby state (to be described later).

The user can set a format, frame rate, number of pixels, and data rate of a moving image to be recorded in the recording standby state. In this embodiment, the user can set one of 30 fps (frames per sec) and 24 fps as a frame rate of a moving image to be recorded. Also, the user sets one of 1920 pixels in the horizontal direction×1080 pixels in the vertical direction and 1280 pixels in the horizontal direction×720 pixels in the vertical direction as the number of pixels of a moving image to be recorded. Furthermore, the user can set one of 24 Mbps (Megabits per sec), 17 Mbps, and 4 Mbps as a data rate of a moving image to be recorded.

Note that as the frame rate, number of pixels, or data rate, values other than the aforementioned values may be set. Also, all of setting items of the frame rate, number of pixels, or data rate need not always be set by the user. For example, the user may arbitrarily set at least one of these plurality of setting items. Alternatively, these plurality of setting items may be associated with each other, and when the user updates one of these setting items, settings of other items may be automatically (synchronously) updated. The control unit 108 stores information indicating the selected recording medium, recording format, frame rate, number of pixels, and data rate in an internal nonvolatile memory.

After the recording medium as a recording destination, recording format, and other setting items are set in the recording standby state, when the user inputs an image capturing start instruction using the operation unit 107, the control unit 108 controls the respective units to start recording of moving image data in the recording medium set as the recording destination. In response to an instruction from the control unit 108, the image capturing unit 101 outputs a moving image signal, and temporarily stores that signal in the memory 102 via the internal bus 114. Also, the audio input unit 106 stores an acquired audio signal in the memory 102.

In a moving image recording operation, the control unit 108 generates moving image data and audio data using the first signal processing unit 103. The first signal processing unit 103 encodes the moving image signal stored in the memory 102 in accordance with an instruction from the control unit 108, and stores the encoded moving image signal as moving image data in the memory 102 again. Also, the first signal processing unit 103 reads out the audio signal from the memory 102, encodes this audio signal, and stores the encoded audio signal in the memory 102 again. When the recording medium 112 is selected as the recording destination, the control unit 108 instructs the first recording/reproduction unit 109 to read out the moving image data and audio data from the memory 102, and to record the readout data in the recording medium 112. Then, when the user inputs an image capturing stop instruction using the operation unit 107, the control unit 108 instructs the first recording/reproduction unit 109 to stop recording.

In this embodiment, a series of moving image data and audio data, which are recorded during an interval between the image capturing start instruction and image capturing stop instruction, are managed as one file. When a recording file has reached a predetermined size after a recording instruction by the user, or when a recording time has reached a predetermined threshold time, the control unit 108 stops recording of a moving image and audio.

When the recording format is the MP4 file format, the control unit 108 instructs the first signal processing unit 103 to process a first frame at a recording start timing of a moving image as a still image signal, and to store the still image signal in the memory 102 as still image data. Then, after the end of recording, the control unit 108 instructs the first or second recording/reproduction unit 109 or 110 to read out the still image data recorded in the memory 102, and to store and record the readout still image data in a moving image file of the MP4 file format.

On the other hand, when the user inputs a still image capturing instruction using the operation unit 107 in the recording standby state, the control unit 108 instructs the image capturing unit 101 to record a still image. The image capturing unit 101 generates a still image signal for one frame according to the still image recording instruction, and stores the generated still image signal in the memory 102. The first or second signal processing units 103 or 104 encodes the still image signal stored in the memory 102 according to the still image recording instruction from the control unit 108, and stores the encoded still image signal in the memory 102 again. The control unit 108 controls one of the first and second recording/reproduction units 109 and 110 to record the still image data in the recording medium selected as a still image recording destination. In this embodiment, MP4 moving image data and still image data are recorded according to, for example, the DCF (Design rule for Camera File system) standard.

The reproduction processing will be described below. When the user inputs a reproduction mode instruction using the operation unit 107, the control unit 108 displays, on the display unit 105, an index screen including representative images (thumbnails) of moving image files recorded in the recording medium selected as the recording destination of the recording media 112 and 113. The user selects one of the representative images of respective moving image files displayed on the display unit 105, and inputs a reproduction instruction by operating the operation unit 107. When the reproduction instruction is input, the control unit 108 controls the recording/reproduction unit corresponding to the selected recording medium of the first and second recording/reproduction units 109 and 110 to reproduce a moving image file corresponding to the selected representative image.

The first or second recording/reproduction unit 109 or 110 reads out a part of the designated moving image file from the recording medium as needed, and stores readout data in the memory 102 in accordance with an instruction from the control unit 108. The first signal processing unit 103 reads out the moving image file from the memory 102, decodes the readout moving image file, and stores the decoded moving image file in the memory 102 again as reproduced moving image data. The display unit 105 reads out the reproduced moving image data from the memory 102, and displays the readout moving image data. When the user inputs a reproduction stop instruction using the operation unit 107, the control unit 108 stops reproduction of the moving image file, and displays the index screen on the display unit 105 again. When the user inputs a still image reproduction instruction using the operation unit 107, the control unit 108 generates an index screen including representative images of still image files recorded in the recording medium, and displays the index screen on the display unit 105. The control unit 108 reproduces a still image file corresponding to a representative image selected by the user from the recording medium, and displays the reproduced still image on the display unit 105.

A simultaneous recording mode will be described below. The video camera 100 of this embodiment has a simultaneous recording mode function. In the simultaneous recording mode, moving image data and audio data can be simultaneously recorded in the two recording media, that is, the recording media 112 and 113 in the AVCHD or MP4 recording format. For example, a moving image of the AVCHD format can be recorded in one recording medium, and that of the MP4 file format can be recorded in the other recording medium. Alternatively, a moving image of the same recording format, that is, a moving image of the AVCHD format or MP4 file format can be recorded in both the recording medium.

In this embodiment, the aforementioned setting items associated with moving images to be simultaneously recorded can be independently set. For example, the data rate of a moving image to be recorded in one recording medium can be set to be 24 Mbps, and that of a moving image to be recorded in the other recording medium can be set to be 17 or 4 Mbps. However, the frame rate cannot be independently set, and moving images are recorded in the respective recording media at the same frame rate. The control unit 108 changes the driving timing of an image sensor of the image capturing unit 101 according to the frame rate set by the user. For this reason, assume that the frame rate cannot be independently set in this embodiment. Note that the frame rate may be independently set using, for example, a method of realizing a desired frame rate by synthesizing a plurality of frames of a moving image from the image capturing unit 101 without changing the driving timing of the image sensor.

Figure 2A:
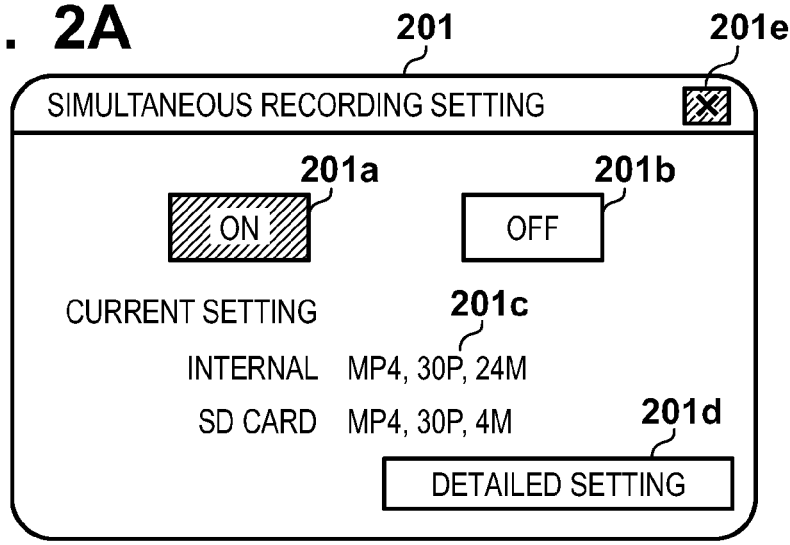
FIGS. 2A to 2C are views showing setting screens of a moving image in a simultaneous recording mode.

When the user inputs a simultaneous recording mode setting instruction using the operation unit 107 in the recording standby state, the control unit 108 displays a simultaneous recording mode setting screen on the display unit 105. FIG. 2A shows a setting screen displayed on the display unit 105 when the simultaneous recording mode setting instruction is input. When the simultaneous recording mode setting instruction is input, a screen 201, which allows the user to set ON/OFF of the simultaneous recording mode, as shown in FIG. 2A, is displayed on the display unit 105. A button 201a is selected when the simultaneous recording mode is to be ON, and a button 201b is selected when the simultaneous recording mode is to be OFF. An information display field 201c displays currently set information of the simultaneous recording mode, a button 201d is selected when the current settings are to be changed, and a button 201e is selected to close the screen 201.

The user can select ON/OFF of the simultaneous recording mode by operating the buttons 201a and 201b in the screen 201. When the simultaneous recording mode is set to be OFF, a state set immediately before that setting (a simultaneous recording mode setting state displayed in the information display field 201c when the simultaneous recording mode is switched from ON to OFF) is held in the internal nonvolatile memory of the control unit 108. The current settings displayed in the information display field 201c indicates a recording format, frame rate, and recording mode (data rate) in turn from the left. When the user wants to change the current settings, he or she selects the button 201d. When the button 201d is selected, a selection screen 202 shown in FIG. 2B is displayed on the display unit 105.

Figure 2B:
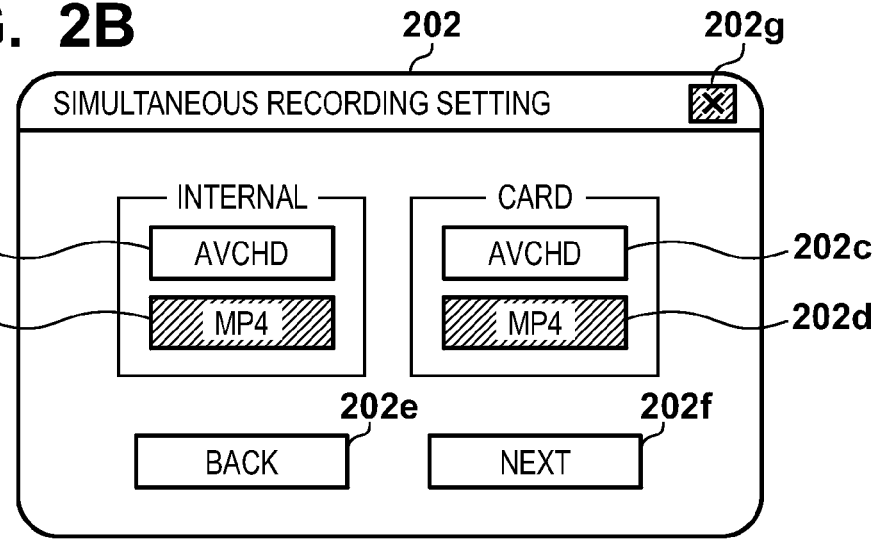

FIG. 2B shows the selection screen 202 which allows the user select a recording format of the simultaneous recording mode for respective recording media. A button 202a is used to instruct to set AVCHD recording for the recording medium 112, and a button 202b is used to instruct to set MP4 recording for the recording medium 112. Also, a button 202c is used to instruct to set AVCHD recording for the recording medium 113, and a button 202d is used to instruct to set MP4 recording for the recording medium 113. A button 202e is used to return to the screen 201, a button 202f is used to transit to a screen 203 (FIG. 2C), and a button 202g is used to close the screen 202. Using such user interface, the user can freely select recording formats for the respective recording media in this way. In this example, one of recording of a moving image file of the AVCHD format and that of a moving image file of the MP4 format can be selected for each recording medium. The user can change the recording formats of the recording media anytime he or she wants in the recording standby state.

Figure 2C:
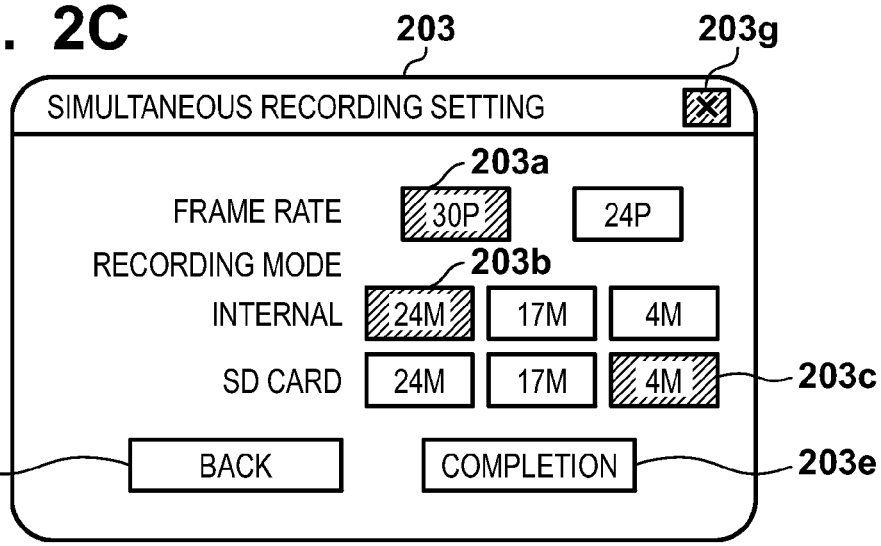

FIG. 2C shows a screen displayed on the display unit 105 after the user presses the button 202f on the screen 202. A button 203a is used to instruct to set a frame rate. A button 203b is used to instruct to set a recording mode (data rate) of the recording medium 112, and a button 203c is used to instruct to set a recording mode (data rate) of the recording medium 113. A button 203d is used to return to the screen 202, and a button 203e is used to complete simultaneous recording mode settings and to close the screen 203. A button 203g is also used to close the screen 203. Note that in this embodiment, each recording mode (data rate) is associated with the number of pixels of a moving image to be recorded, and the number of pixels is determined according to the selected recording mode. For example, assume that when the user selects 24 Mbps or 17 Mbps, 1920 pixels in the horizontal direction×1080 pixels in the vertical direction are set as the number of pixels. On the other hand, assume that when the user selects 4 Mbps as the recording mode, 1280 pixels in the horizontal direction×720 pixels in the vertical direction are set as the number of pixels. Note that the screen 203 may clearly specify the AVCHD or MP4 format which is set for each of the recording medium 112 ("internal" in FIG. 2C) and the recording medium 113 ("SD card" in FIG. 2C) on the screen shown in FIG. 2B.

Figure 2D:
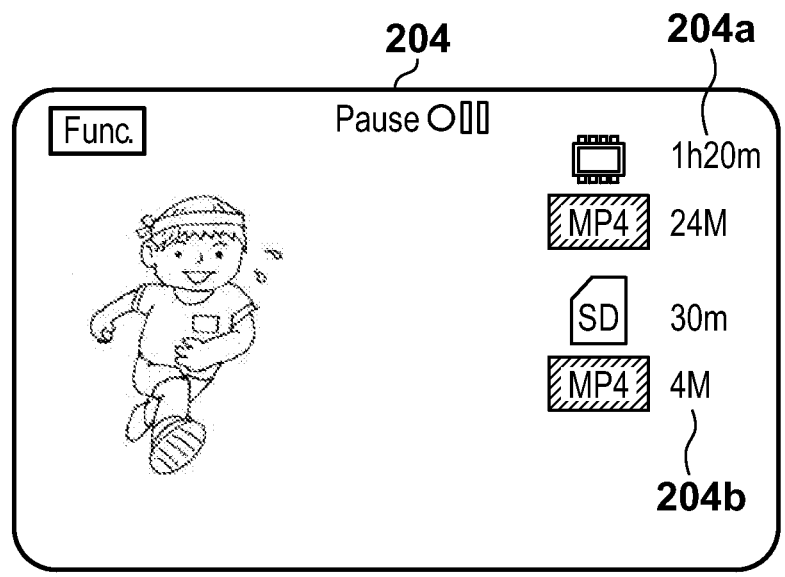
FIGS. 2D and 2E are views showing screens at the time of a moving image capturing operation in the simultaneous recording mode.
Figure 2E:
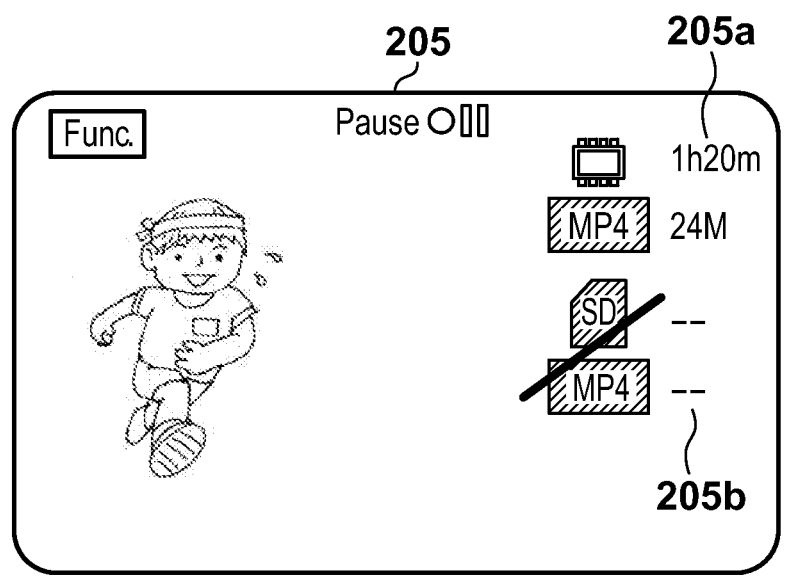

FIGS. 2D and 2E show display screens in the recording standby state when the simultaneous recording mode is ON. Also, even when the simultaneous recording mode is set to be ON using the screen 201, it is not enabled unless all of the following conditions 1 to 6 are satisfied.

(Condition 1) A scene upper limit of the set recording format is not reached.

(Condition 2) A file system is not unauthorized.

(Condition 3) The remaining capacity of each recording medium is not less than a predetermined value.

(Condition 4) The detachable recording medium is loaded.

(Condition 5) The detachable recording medium is not protected.

(Condition 6) The protection lid of the detachable recording medium is closed.

FIG. 2D shows a screen 204 displayed on the display unit 105 when the simultaneous recording mode is set ON, and conditions 1 to 6 are satisfied. An information display field 204a indicates that the recording format of the recording medium 112 is MP4, a recordable time is 1 hour 20 min, and the recording mode is 24 Mbps. Also an information display field 204b indicates that the recording format of the recording medium 113 is MP4, a recordable time is 30 min, and the recording mode is 4 Mbps. When both the information display fields 204a and 204b are displayed on the screen 204, the simultaneous recording mode is enabled.

FIG. 2E shows a recording screen 205 displayed on the display unit 105 when the simultaneous recording mode is set ON, and at least one of conditions 1 to 6 is not satisfied. The recording screen 205 is displayed when the recording medium 113 does not satisfy any of conditions 1 to 6. An information display field 205a indicates that recording can be executed since conditions 1 to 6 are satisfied. In an information display field 205b, a recordable time and bit rate are not displayed since all of conditions 1 to 6 are not satisfied for the recording medium 113. The user changes the state of the recording medium 113 to satisfy all conditions 1 to 6, thus enabling the simultaneous recording mode.

The control unit 108 acquires required information from each of the first and second recording/reproduction units 109 and 110, and discriminates based on the acquired information whether or not the aforementioned conditions are satisfied. In this embodiment, identification information is appended to each moving image file so as to uniquely specify that file. The identification information is 16-byte data. The first embodiment uses, as the identification information a UUID (Universally Unique Identifier) described in ISO/IEC 11578:1996 (Information technology—Open Systems Interconnection—Remote Procedure Call (RPC)). Also, this identification information is stored at a predetermined position in each moving image file. For example, in a moving image file of the MP4 file format, the identification information is stored in a uuid Box (user-extension box).

FIG. 4 is a flowchart showing processing of the simultaneous recording mode. The processing shown in FIG. 4 is executed when the control unit 108 controls the respective units by executing a program stored in the memory 102. As described above, when the user sets the simultaneous recording mode to be ON in the recording standby mode, and inputs a recording start instruction using the operation unit 107, the processing shown in FIG. 4 is started.

Note that in the following description, when different file formats are set for moving images to be recorded in the respective recording media, a moving image file of the AVCHD format will be described as a main moving image file, and that of the MP4 file format will be described as a sub moving image file. When the same file format is set but different data rates are set for moving images to be recorded in the respective recording media, a moving image file of a higher data rate will be described as a main moving image file, and that of a lower data rate will be described as a sub moving image file. When the same file format and data rate are set for moving images to be recorded in the respective recording media, a moving image file to be recorded in the predetermined recording medium will be described as a main moving image file. In this embodiment, assume that a moving image file to be recorded in the internal recording medium 112 of the video camera 100 is a main moving image file.

When a recording start instruction is input, the control unit 108 generates identification information of a main moving image file (step S401). Next, the control unit 108 discriminates whether or not setting states of the recording format, data rate, and the number of pixels of moving images to be recorded in the respective recording media are the same (step S402). If the setting states of moving images are the same, the format of the moving image files recorded in the two recording media, and states of moving image data to be stored in the respective moving image files are the same. For this reason, the control unit 108 generates the same identification information as the main moving image file identification information generated in step S401 as that for a sub moving image file (step S403). On the other hand, if the setting states of moving images to be recorded in the two recording media are different, the control unit 108 generates new identification information of a sub moving image file (step S404). That is, as identification information, a UUID, which assumes a value different from the UUID of the main moving image file, is generated for the sub moving image file.

Next, the control unit 108 creates new moving image files on the respective recording media, and records the corresponding pieces of identification information in these files (step S405). Subsequently, the control unit 108 instructs the image capturing unit 101 to output moving images according to their setting states, and records moving image data and audio data in the respective recording media (step S406) in accordance with the set recording formats. In this case, when the number of pixels of the main moving image is different from that of the sub moving image, the control unit 108 instructs the image capturing unit 101 to output a moving image of 1920×1080 pixels.

Also, the control unit 108 instructs the first signal processing unit 103 to change the number of pixels according to the setting state of the main moving image. Furthermore, the control unit 108 instructs the first signal processing unit 103 to adjust the data rate of moving image data to be encoded and to set the recording format according to the setting state of the main moving image. On the other hand, the control unit 108 instructs the second signal processing unit 104 to change the number of pixels according to the setting state of the sub moving image. Also, the control unit 108 instructs the second signal processing unit 104 to adjust the data rate of moving image data to be encoded and to set the recording format according to the setting state of the sub moving image. As described above, in the simultaneous recording mode, the first and second signal processing units 103 and 104 simultaneously process moving image data, and respectively stores the processed moving image data in the memory 102. The control unit 108 instructs each of the first and second recording/reproduction units 109 and 110 to read out the main or sub moving image data, and audio data, and to record the readout data according to the set recording format.

After that, the control unit 108 continues recording until the user inputs a recording stop instruction. If the user inputs the recording stop instruction (YES in step S407), the control unit 108 stops recording of the moving image files in the respective recording media (step S408). Note that the recording is stopped, as described above, when the size of the moving image file recorded in either recording medium has reached the predetermined size, or the recording time has reached the predetermined threshold in the recording processing in step S406 before the recording stop instruction by the user is output.

In this manner, according to this embodiment, when moving images to be simultaneously recorded have the same format and setting state in the simultaneous recording mode, the same identification information is appended to respective moving image files. When moving images to be simultaneously recorded have different formats and setting states in the simultaneous recording mode, different pieces of identification information are appended to the moving image files. For this reason, the same moving image file recorded in the respective recording media can be easily identified. Even for the moving image files which are simultaneously recorded, if they have different setting states of moving images, different pieces of identification information are appended. Hence, the user can be prevented from recognizing the moving image files having the different setting states as the same moving image by mistake.

Second Embodiment

The second embodiment will be described below. The arrangement and basic processing of a video camera 100 according to the second embodiment are the same as those of the first embodiment. In the second embodiment, identification information appended to each moving image file is different from the first embodiment.

FIG. 3 shows additional information 301 and identification information 302 to be recorded in the second embodiment. The additional information 301 includes:

a serial number (16 bytes);
an image capturing date/time (4 bytes);
a total recording count (4 bytes); and
sub information (1 byte).

The serial number information is that indicating a number individually assigned by the manufacturer to the video camera 100. The image capturing date/time information is that indicating an elapsed time since a predetermined date and time. For example, in this embodiment, the image capturing date/time information indicates an elapsed time since Jan. 1, 1970, 00:00:00 AM. The total recording count information is that indicating a total count of recording start instructions output from an operation unit 107 since the manufacture of the video camera 100. The sub information indicates whether or not setting states of two moving image files recorded in a simultaneous recording mode are the same. For example, a predetermined value "0" is set in the sub information when setting states of two moving image files recorded in the simultaneous recording mode are the same, or a predetermined value "1" is set when they are different. Note that as a value of the sub information, predetermined values other than these values may be set. Also, in a normal recording mode, the predetermined value "0" is set as the sub information.

The identification information 302 is 16-byte information. In this embodiment, the 0th to 3rd bytes of the serial number and the image capturing date/time (4 bytes), the 4th to 7th bytes of the serial number and the total recording count (4 bytes), and the 8th byte of the serial number and the sub information (1 byte) are respectively EX-ORed. Then, 16-byte data including 9-byte data obtained by the EX-ORing, and the 9th to 15th bytes of the serial number are used as the identification information 302.

In FIG. 3, hatched bytes of the identification information 302 use data of the 9th to 15th bytes of the serial number intact. Bytes other than the hatched bytes of the identification information 302 include data obtained by the EX-ORing.

In this manner, bytes of the additional information 301 other than the sub information assume the same value irrespective of whether or not setting states of two moving image files recorded in the simultaneous recording mode are the same. For this reason, the identification information 302 assumes the same value when setting states of two moving image files recorded in the simultaneous recording mode are the same. On the other hand, when setting states of two moving image files recorded in the simultaneous recording mode are different, the identification information 302 includes a different 8th-byte value.

Figure 5:
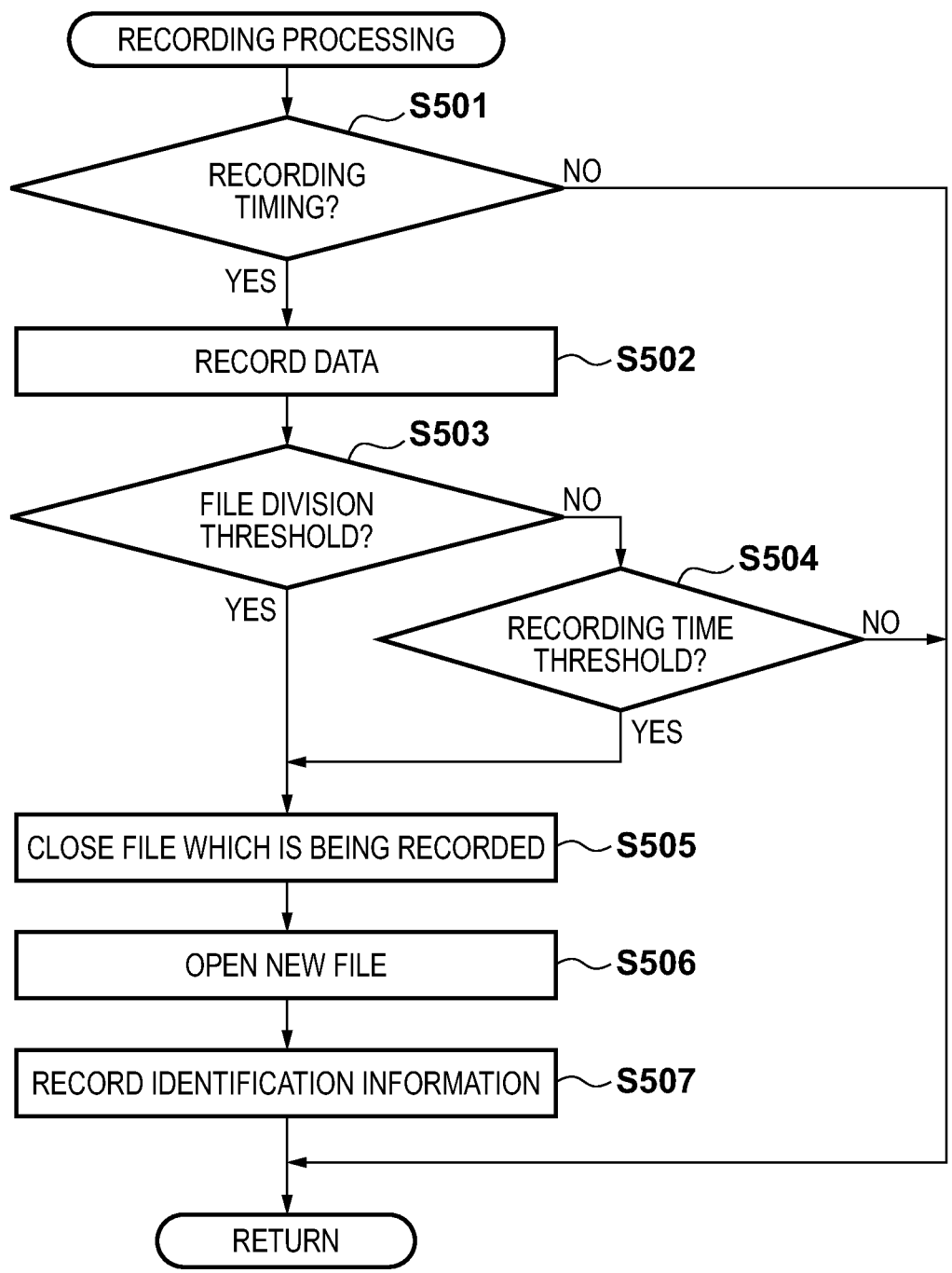
FIG. 5 is a flowchart showing recording processing of the simultaneous recording mode.

Processing of the simultaneous recording mode according to the second embodiment will be described below. FIG. 5 is a flowchart showing recording processing in step S406 of FIG. 4. Note that in this embodiment, the identification information 302 shown in FIG. 3 is generated in step S401 of FIG. 4. Also, by setting "1" in the sub information shown in FIG. 3 in step S404 of FIG. 4, identification information 302 of a sub moving image is generated.

Also, in the second embodiment, when the size of a moving image file has reached a predetermined size or when a recording time has reached a predetermined threshold during recording of moving images in the simultaneous recording mode, the file which is being recorded is closed, and a new moving image file is generated to continue recording. In the second embodiment, the predetermined size for file division is determined based on a size defined by a file system. For example, in case of FAT32, since an upper limit file size is 4 GB (Gbytes), the predetermined size for file division is set to be smaller than 4 GB. In this embodiment, the threshold of the recording time for file division is set to be 30 min.

The processing shown in FIG. 5 is independently executed in association with the recording processing for each recording medium. Referring to FIG. 5, when recording is started, moving image data, which are respectively processed by first and second signal processing units 103 and 104, and audio data are stored in a memory 102. Then, a control unit 108 discriminates whether or not a size of unrecorded moving image data and audio data stored in the memory 102 has reached a write threshold, and a recording timing has been reached (step S501).

If the recording timing has not been reached yet, recording on a recording medium is skipped, and the process advances to step S407 of FIG. 4. On the other hand, if the recording timing has been reached, the control unit 108 instructs a first or second recording/reproduction unit 109 or 110 to read out unrecorded data from the memory 102, and to record the readout data. Upon reception of this instruction, the first or second recording/reproduction unit 109 or 110 reads out data from the memory 102, and records the readout data in a recording medium 112 or 113 (step S502). In this embodiment, a recording data rate of each recording medium is higher than a data rate of encoded moving image data and audio data. For this reason, when a data write operation in the recording medium is started, a data amount of unrecorded data stored in the memory 102 is decreased. Then, when the data amount of the unrecorded data stored in the memory 102 is smaller than a write stop threshold, the control unit 108 instructs the first or second recording/reproduction unit 109 or 110 to stop the write operation in the recording medium.

After one write operation is complete in this way, the control unit 108 discriminates whether or not a size of a moving image file which is being currently recorded in the recording medium 112 or 113 has reached the threshold size for file division (step S503). If the size of the moving image file has reached the threshold size for file division, the control unit 108 instructs the first or second recording/reproduction unit 109 or 110 to close the file which is being currently recorded (step S505) and to generate a new file (step S506). Then, the control unit 108 instructs the first or second recording/reproduction unit 109 or 110 to store the additional information 301 and identification information 302 in the newly generated moving image file (step S507).

In this case, when the closed file is a main moving image file, the identification information 302 of a main moving image is recorded. On the other hand, when the closed file is a sub moving image file, the identification information 302 of a sub moving image is recorded. Also, the same additional information 301 is appended and recorded in one or more moving image files which are generated from a recording start instruction until a recording stop instruction, which are input by the user. For example, the additional information 301 set with sub information=0 is recorded in the recording medium which records a main moving image file, and the additional information 301 set with sub information=1 is recorded in the recording medium which records a sub moving image file.

Note that when data rates of moving image data to be recorded in the simultaneous recording mode are different, since timings at which sizes of moving image files to be recorded reach the file division threshold are different from each other, the processing shown in FIG. 5 is independently executed for each recording medium.

On the other hand, if the size of the moving image file which is being recorded does not reach the file division threshold size in step S503, the control unit 108 discriminates whether or not the predetermined time has been reached since the beginning of recording of the moving image file which is being currently recorded (step S504). If the recording time of the moving file has not reached the predetermined time, the control unit 108 advances to step S407 of FIG. 4. On the other hand, if the recording time of the moving image file has reached the predetermined time, the control unit 108 instructs the first or second recording/reproduction unit 109 or 110 to close the file which is being currently recorded (step S505) and to generate a new file (step S506), as described above. Then, the control unit 108 instructs the first or second recording/reproduction unit 109 or 110 to store the additional information 301 and identification information 302 in the newly created moving image file (step S507). The identification information and additional information to be recorded are as described above.

As described above, according to the second embodiment, the identification information, which assumes the same value when setting states of two moving image files recorded in the simultaneous recording mode are the same, or assumes a different partial value when setting states of two moving image files are different, is recorded. For this reason, by confirming the identification information, moving image files recorded in the respective recording media in the simultaneous recording mode can be easily identified. Furthermore, whether or not setting states of simultaneously recorded moving image files are the same can be easily identified without reproducing moving image data stored in the moving image files.

Note that the aforementioned embodiments adopt the arrangement in which states of moving images to be simultaneously recorded are independently and arbitrarily set for respective recording media according to a user instruction. However, the present invention is not limited to this. For example, the aforementioned arrangement is applicable to temporally continuous information data. For example, a state of audio data may be set in accordance with a user instruction. For example, when an audio file format such as MP3, WAV, or AAC can be set for each recording medium, audio files of different formats can be simultaneously recorded in the respective recording media.

Note that the control of the overall apparatus by the control unit 108 may be implemented by a single hardware component or by sharing processes using a plurality of hardware components.

The present invention has been described in detail based on its preferred embodiments. However, the present invention is not limited to these specific embodiments, and various other embodiments without departing from the scope of the present invention are included in the present invention. Furthermore, the aforementioned embodiments are merely those of the present invention, and can be combined as needed.

The aforementioned embodiments have explained the example in which the present invention is applied to the video camera. However, the present invention is not limited to this example. That is, the present invention is applicable to electronic apparatuses such as a personal computer, PDA, mobile phone terminal, and portable electronic apparatus, which can be controlled to simultaneously record images in a plurality of recording media.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-283672, filed Dec. 26, 2012, which is hereby incorporated by reference herein in its entirety.

What is claimed is:

1. A recording apparatus comprising:
    a setting unit configured to independently set, in accordance with a user instruction, conditions of a plurality of moving image data to be simultaneously recorded on a first recording medium and a second recording medium in a simultaneous recording mode, wherein the setting unit sets one of a plurality of conditions relating to a data rate of moving image data, selected by the user, as a condition of the moving image data to be recorded on the first recording medium in the simultaneous recording mode and sets one of the plurality of conditions, selected by the user, as a condition of the moving image data to be recorded on the second recording medium in the simultaneous recording mode;

a processing unit configured to compress moving image data by a predetermined compression method in accordance with the conditions set by said setting unit and to generate a plurality of moving image data, each of which is compressed by the predetermined compression method, to be recorded on the first recording medium and the second recording medium in the simultaneous recording mode, wherein the processing unit compresses the moving image data to be recorded on the first recording medium by the predetermined compression method in accordance with a data rate set by the setting unit as the condition of the moving image data to be recorded on the first recording medium, and compresses the moving image data to be recorded on the second recording medium by the predetermined compression method in accordance with a data rate set by the setting unit as the condition of the moving image data to be recorded on the second recording medium;

a discrimination unit configured to discriminate whether same conditions are set as the conditions of the plurality of moving image data to be recorded on the first recording medium and the second recording medium in the simultaneous recording mode;

a generation unit configured to generate, in accordance with a discrimination result of the discrimination unit, identification information for discriminating whether the plurality of moving image data recorded on the first recording medium and the second recording medium in the simultaneous recording mode have the same conditions; and a recording unit configured to simultaneously record the plurality of moving image data generated by said processing unit on the first recording medium and the second recording medium in the simultaneous recording mode, wherein the recording unit records a plurality of pieces of the identification information generated by the generation unit on the first recording medium and the second recording medium in the simultaneous recording mode.

2. The apparatus according to claim 1, wherein said generation unit sets different values in predetermined portions in the plurality of pieces of identification information, if it is discriminated that different conditions are set as the conditions of the plurality of moving image data to be recorded on the first recording medium and the second recording medium in the simultaneous recording mode.

3. The apparatus according to claim 2, wherein said generation unit sets same values in portions portion other than the predetermined portions in the plurality of pieces of the identification information recorded on the first recording medium and the second recording medium based on a recording date of the information data.

4. The apparatus according to claim 1, wherein
said recording unit records a file including the moving image data, and said recording unit appends the same identification information to a plurality of files, which are generated during a period from a recording start instruction until a recording stop instruction of the information data.

5. The apparatus according to claim 1, wherein when the same conditions are set as the conditions of the moving image data to be simultaneously recorded in the first recording medium and the second recording medium, said generation unit generates the plurality of pieces of identification information having the same values.

6. The apparatus according to claim 1, further comprising:
an image capturing unit,
wherein processing unit processes moving image data obtained by said image capturing unit according to the conditions set by said setting unit so as to generate a plurality of moving image data to be recorded in the first recording medium and the second recording medium in the simultaneous recording mode.

7. A recording apparatus comprising:
a setting unit configured to independently set conditions of a plurality of moving image data to be simultaneously recorded on a first recording medium and a second recording medium in a simultaneous recording mode according to a user instruction, wherein the setting unit sets one of a plurality of conditions selected by the user as a condition of the moving image data to be recorded on the first recording medium in the simultaneous recording mode and sets one of the plurality of conditions selected by the user as a condition of the moving image data to be recorded on the second recording medium in the simultaneous recording mode;

a processing unit configured to process the moving image data acquired by an image capturing unit according to the conditions set by said setting unit so as to generate a plurality of moving image data to be recorded on the first recording medium and the second recording medium in the simultaneous recording mode;

a discrimination unit configured to discriminate whether same conditions are set as the conditions of the plurality of moving image data to be recorded on the first recording medium and the second recording medium in the simultaneous recording mode;

a generation unit configured to generate, in accordance with a discrimination result of the discrimination unit, identification information for discriminating whether the plurality of moving image data recorded on the first recording medium and the second recording medium in the simultaneous recording mode have the same conditions, wherein the generation unit performs a first logical calculation of a first part in first information of n bits and second information and generates the identification information of n bits including another part of the first information than the first part and a result of the first logical calculation, wherein the generation unit changes a value of the second information in accordance with the discrimination result of the discrimination unit; and a recording unit configured to simultaneously record the plurality of moving image data generated by the processing unit on the first recording medium and the second recording medium, wherein the recording unit records a the plurality of pieces of identification information generated by the generation unit on first recording medium and the second recording medium in the simultaneous recording mode.

8. The apparatus according to claim 7, wherein said recording unit records a moving image file including the moving image data and
records the same identification information in a plurality of moving image files recorded from a recording start instruction to a recording stop instruction of the moving image data.

9. The recording apparatus according to claim 7, wherein the generation unit performs a second logical calculation of a second part in the first information and third information and a third logical calculation of a third part in the first information and fourth information, and generates the identification information of n bits including the result of the first logical calculation, a result of the second logical calculation, a result of the third logical calculation, and a fourth part in the first information different from the first part, the second part, and the third part.

10. The recording apparatus according to claim 9, wherein the generation unit determines the third information and the fourth information irrespectively the discrimination result of the discrimination unit.

11. The recording apparatus according to claim 9, wherein the first information is information relating to a serial number of the recording apparatus, the third information is information relating to a recording date and the fourth information is information relating to a recording count.

12. A control method of a recording apparatus, comprising:
a setting step of independently setting, in accordance with a user instruction, conditions of a plurality of moving image data to be simultaneously recorded on a first recording medium and a second recording medium in a simultaneous recording mode,
wherein, in the setting step, one of a plurality of conditions relating to a data rate of moving image data, selected by the user, is set as a condition of the moving image data to be recorded on the first recording medium in the simultaneous recording mode and one of the plurality of conditions, selected by the user, is set as a condition of the moving image data to be recorded on the second recording medium in the simultaneous recording mode;
a processing step of compressing moving image data by a predetermined compression method in accordance with the conditions set in the setting step and generating a plurality of moving image data to be recorded on the first recording medium and the second recording medium in the simultaneous recording mode,
wherein, in the processing step, the moving image data to be recorded on the first recording medium is compressed by the predetermined compression method in accordance with a data rate set in the setting step as the condition of the moving image data to be recorded on the first recording medium, and the moving image data to be recorded on the second recording medium is compressed by the predetermined compression method in accordance with a data rate set in the setting step as the condition of the moving image data to be recorded on the second recording medium;
a discrimination step of discriminating whether same conditions are set as the conditions of the plurality of moving image data to be recorded on the first recording medium and the second recording medium in the simultaneous recording mode;
a generation step of generating, in accordance with a discrimination result in the discrimination step, identification information for discriminating whether the plurality of moving image data recorded on the first recording medium and the second recording medium in the simultaneous recording mode having the same conditions; and
a recording step of recording simultaneously the plurality of moving image data generated in the processing step on the first recording medium and the second recording medium in the simultaneous recording mode,
wherein in the recording step, a plurality of pieces of the identification information generated in the generation step are recorded on the first recording medium and the second recording medium in the simultaneous recording mode.

* * * * *